United States Patent
Chen et al.

(10) Patent No.: US 7,912,365 B2
(45) Date of Patent: Mar. 22, 2011

(54) IMAGE CAPTURE APPARATUS WITH CHARGED CAPACITOR SWITCHING DEVICE FOR PHOTOFLASH

(75) Inventors: Yen-Chao Chen, Taichung (TW); Jung-Ching Wang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 113 days.

(21) Appl. No.: 12/345,850

(22) Filed: Dec. 30, 2008

(65) Prior Publication Data

US 2010/0098400 A1    Apr. 22, 2010

(30) Foreign Application Priority Data

Oct. 20, 2008    (TW) ............................... 97140146 A

(51) Int. Cl.
*G03B 15/03*    (2006.01)

(52) U.S. Cl. ......................................... 396/157; 396/205

(58) Field of Classification Search ................... 396/157, 396/164, 173, 201–203, 205–206; 315/149, 315/241 P; 348/371
See application file for complete search history.

(56) References Cited

U.S. PATENT DOCUMENTS

| | | | | |
|---|---|---|---|---|
| 4,465,353 A | * | 8/1984 | Yoshida et al. | 396/157 |
| 6,151,073 A | * | 11/2000 | Steinberg et al. | 348/371 |
| 6,198,880 B1 | * | 3/2001 | Hosaka et al. | 396/6 |
| 6,456,797 B1 | * | 9/2002 | Boyd et al. | 396/155 |
| 7,512,333 B2 | * | 3/2009 | Carnevale et al. | 396/205 |
| 2001/0019364 A1 | * | 9/2001 | Kawahara | 348/362 |
| 2007/0110427 A1 | * | 5/2007 | Tsai | 396/166 |
| 2009/0160944 A1 | * | 6/2009 | Trevelyan et al. | 348/187 |

FOREIGN PATENT DOCUMENTS

GB    2060288 A  *  4/1981

* cited by examiner

*Primary Examiner* — Clayton E Laballe
*Assistant Examiner* — Leon W Rhodes
(74) *Attorney, Agent, or Firm* — Thomas/Kayden

(57) ABSTRACT

A charged capacitor switching device for a photoflash is provided and includes a flash control unit, a capacitor charging/discharging unit, a charged capacitor switching unit and an illumination modulator. The capacitor charging/discharging unit coupled to the flash control unit includes a plurality of capacitors connected in parallel and switches coupled thereto respectively. The charged capacitor switching unit determines whether each switch is opened or closed according to a compensation parameter. The illumination modulator compares an environmental illumination and a pre-flash illumination to generate a compared result, determines whether the compared result has reached a threshold, obtains the compensation parameter according to the compared result when the compared result is below the threshold, and drives the flash control unit to generate a flash illumination corresponding to the compensation parameter.

20 Claims, 3 Drawing Sheets

IMAGE CAPTURE APPARATUS WITH CHARGED CAPACITOR SWITCHING DEVICE FOR PHOTOFLASH

CROSS REFERENCE TO RELATED APPLICATIONS

This Application claims priority of Taiwan Patent Application No. 097140146, filed on Oct. 20, 2008, the entirety of which is incorporated by reference herein.

BACKGROUND OF THE INVENTION

1. Field of the Invention

The invention relates to image capture apparatuses, and more particularly to charged capacitor switching devices and methods capable of increasing photographing distance and rapidly compensating for photographing intensity.

2. Description of the Related Art

Generally, when natural illumination is insufficient or environmental illumination is weak for photographing, for example, at night or in an indoor environment, a traditional camera or a digital camera uses a photoflash to provide supplementary illumination to an object to be photographed.

Conventionally, a photoflash incorporated in a camera usually includes one single capacitor and a device for facilitating the charging thereof. When being charged, the capacitor is provided for the photoflash to emit the auxiliary light for photographing. However, due to the single capacitor, the illumination from the auxiliary light of the photoflash is limited and it is difficult to control the actual exposure of the object to be photographed after the flash. This may result in an overexposed or underexposed photograph.

Specifically, for some conventional techniques, the object to be photographed is first captured without flash illumination before being photographed. Then, a pre-flash (or a preparatory flash) operation is performed on the object to be photographed using the photoflash, thereby capturing an image and obtaining corresponding parameters for the photoflash. Accordingly, the photographing operation is carried out with flash illumination. Meanwhile, according to conventional techniques, because the flash illumination is limited, the photographing quality may be underexposed and poor, as in cases wherein an object is located at a far distance or under a condition of weak environmental illumination. For an image capture apparatus used for outdoor recording of ecological activities, when the photographing operation is performed at night or the object to be photographed is located at a far distance, normally, auxiliary light emitted from the photoflash is insufficient. In addition, after carrying out a pre-flash procedure using the photoflash, it is necessary to once again charge the capacitor. Thus, an extra charging time is required, which is a substantial inconvenience for users.

Therefore, it is desirable to provide an improved image capture apparatus with charged capacitor switching functions for a photoflash to increase the capacity of capacitors supplied to the photoflash, thereby increasing photographing distance and decreasing delay time for charging of the capacitors.

BRIEF SUMMARY OF THE INVENTION

To attain the above objective, the invention is directed at a charged capacitor switching device for a photoflash, comprising a flash control unit, a capacitor charging/discharging unit, a charged capacitor switching unit and an illumination modulator. The flash control unit comprises a photoflash and a driving unit, wherein the driving unit controls a flash duration of the photoflash. The capacitor charging/discharging unit coupled to the flash control unit comprises a plurality of capacitors connected in parallel and switches respectively coupled thereto for controlling charge or discharge operations for each capacitor, wherein the capacitors determine a flash intensity of the photoflash. The charged capacitor switching unit coupled to the capacitor charging/discharging unit determines whether each switch is respectively opened or closed according to a compensation parameter and drives the photoflash to generate a corresponding flash illumination through at least two of the capacitors. The illumination modulator coupled to the flash control unit and the charged capacitor switching unit compares an environmental illumination and a pre-flash illumination to generate a compared result and determines whether the compared result has reached a threshold. If the compared result is below the threshold, the compensation parameter is obtained according to the compared result. Finally, the flash control unit is driven to generate the corresponding flash illumination according to the compensation parameter.

It is noted that the charged capacitor switching unit controls the switches according to a predetermined parameter and drives the photoflash to conduct a first pre-flash through at least one of the capacitors. Further, the charged capacitor switching unit controls the switches according to the compensation parameter and drives the photoflash to generate the corresponding flash illumination through at least two of the capacitors.

The invention further provides a charged capacitor switching method. The method is provided for an image capture apparatus with a photoflash, which is driven by a plurality of capacitors connected in parallel. A first image is captured from an object to be photographed in a first state and an environmental illumination is then acquired according to the first image. Next, a second image is captured from the object to be photographed in a second state and a pre-flash illumination is acquired according to the second image. A compared result is subsequently generated by comparing the environmental illumination and the pre-flash illumination. It is then determined whether the compared result has reached a threshold. When the compared result is below the threshold, a compensation parameter is obtained according to the compared result. The compensation parameter is provided for driving the photoflash to generate a corresponding flash illumination through at least two of the capacitors.

Additionally, the invention provides an image capture apparatus comprising the aforementioned charged capacitor switching device for a photoflash, a lens module and an image sensing unit. The image sensing unit is coupled to the lens module for capturing an object to be photographed through the lens module.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
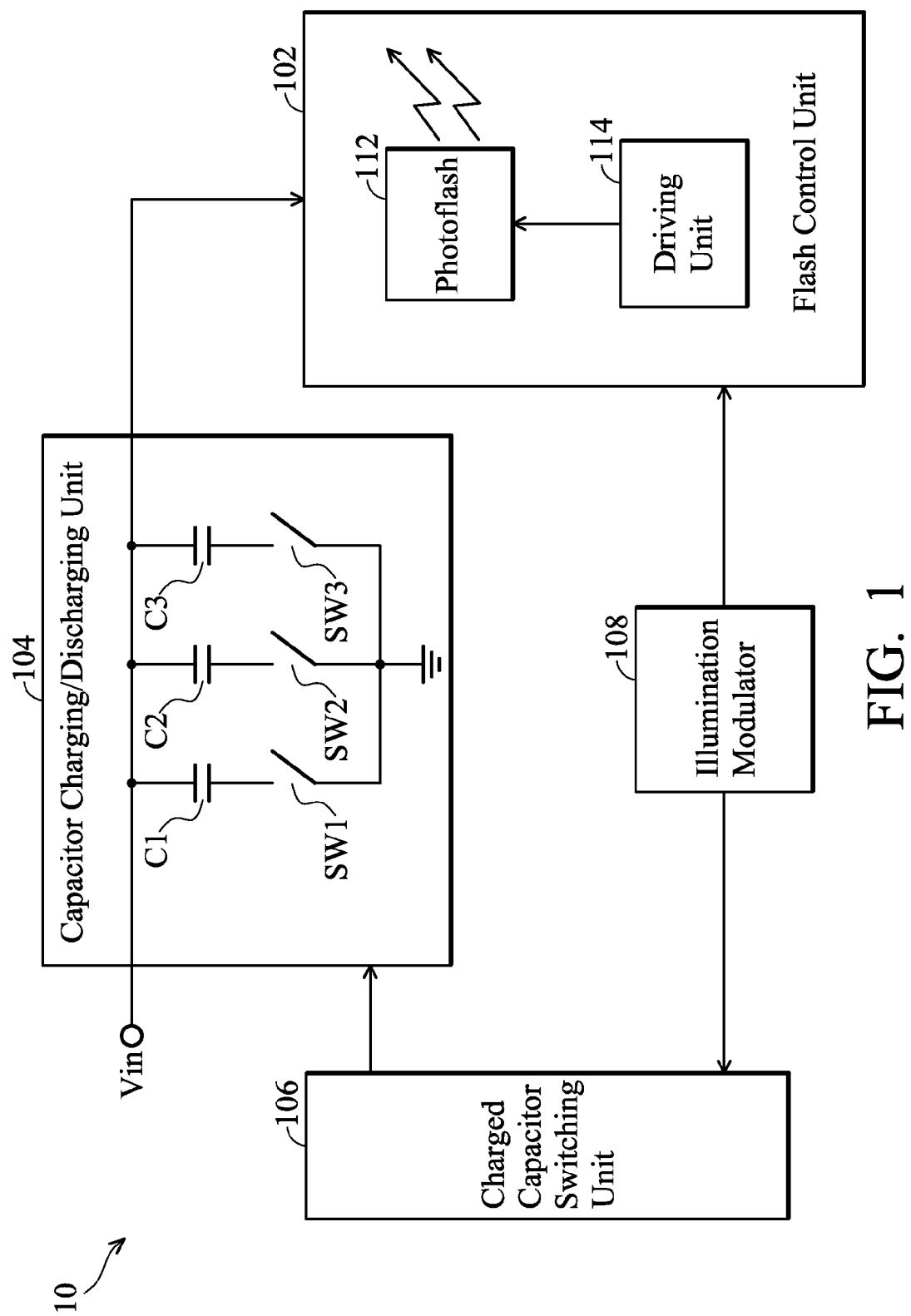
FIG. 1 is a block diagram illustrating a charged capacitor switching device for a photoflash according to one embodiment of the invention.

FIG. 1 is a block diagram illustrating a charged capacitor switching device 10 for a photoflash according to one embodiment of the invention, comprising a flash control unit 102, a capacitor charging/discharging unit 104, a charged capacitor switching unit 106 and an illumination modulator 108.

Referring to FIG. 1, the flash control unit 102 comprises a photoflash 112 and a driving unit 114. In one embodiment, the driving unit 114 is provided for controlling a flash duration of the photoflash 112. The capacitor charging/discharging unit 104 coupled to the flash control unit 102 comprises a plurality of capacitors connected in parallel, such as capacitors C1, C2 and C3 as shown in FIG. 1, for flexibly determining a flash intensity of the photoflash 112. The capacitors C1, C2 and C3 are coupled to respective switches, for example, switches SW1, SW2 and SW3 as shown in FIG. 1. Operations for charging or discharging the capacitors C1~C3 are controlled by the respective switches SW1~SW3. According the embodiment, the charged capacitor switching unit 106 is coupled to the capacitor charging/discharging unit 104 for determining whether each switch (SW1, SW2 or SW3) is opened or closed according to a compensation parameter. The illumination modulator 108 is coupled to the flash control unit 102 and the charged capacitor switching unit 106 for selecting the capacitors according to the captured illumination from an object to be photographed (not shown). The operation of the illumination modulator 108 will be described below in detail with reference to FIG. 1.

When a photographing operation is being carried out, the illumination modulator 108 acquires an environmental illumination according to a first image captured from the object to be photographed in a first state. According to an embodiment, the flash illumination is eliminated in the first state.

Next, the illumination modulator 108 acquires a pre-flash illumination according to a second image captured from the object to be photographed in a second state. In one embodiment, the flash control unit 102 is driven by a predetermined parameter to conduct a first pre-flash operation on an object to be photographed in the second state.

In accordance with one embodiment, the illumination modulator 108 defines a sampling block, such as a 128 by 128 block, in the first image and the second image for obtaining sampling data from the 128 by 128 block. The sampling data is composed of the three colors, i.e., red color (R), green color (G) and blue color (B). The illumination modulator 108 determines corresponding weighting coefficients for the three colors. Further, the illumination modulator 108 acquires the environmental illumination from the sampling block of the first image by summing up a product of values of the three colors from the sampling data and respective weighting coefficients, and acquires the pre-flash illumination from the sampling block of the second image by summing up a product of values of the three colors from the sampling data and respective weighting coefficients.

In addition, the illumination modulator 108 compares the environmental illumination and the pre-flash illumination to generate a compared result and determines whether the compared result has reached a threshold. When the compared result is below the threshold, the compensation parameter is retrieved according to the compared result. In general, the flash illumination supplied by the photoflash is determined according to a flash intensity and a flash duration. In one embodiment, the illumination modulator 108 compensates the flash illumination according to the compared result and acquires a number of capacitors and a pulse time corresponding to the required illumination, thereby controlling the flash intensity and the flash duration of the photoflash. The flash control unit 102 generates a corresponding flash illumination according to the compensation parameter.

For example, when the photoflash 112 conducts a first pre-flash through only one capacitor (such as the capacitor C1) and the number of capacitors is determined to be two capacitors according to the compensation parameter, the illumination modulator 108 instructs the flash control unit 102 to directly utilize the other two capacitors (such as capacitors C2 and C3) for photographing, without waiting for the charging of the capacitor C1. When the number of capacitors is determined to be one capacitor, the photographing operation or repeated shots is carried out by utilizing the remaining capacitors since the illumination from the first pre-flash is sufficient.

More specifically, according to this embodiment, the driving unit 114, such as an insulated-gate bipolar transistor (IGBT), is provided for precisely adjusting the flash duration of the photoflash according to the pulse time. The illumination is accordingly increased with a wider pulse.

In some embodiments, when the number of capacitors determined by the compensation parameter exceeds the number of charged capacitors, the charged capacitor switching unit 106 determines whether an operation for recharging all capacitors or some capacitors used for the first pre-flash is performed.

Also, the charged capacitor switching device 10 further comprises a power supply (not shown) coupled to the capacitor charging/discharging unit 104 for supplying a reference voltage Vin to the capacitors for charging. Thus, before a first pre-flash is performed, the charged capacitor switching unit 106 charges each capacitor C1~C3 by controlling each switch SW1~SW3.

Figure 2:
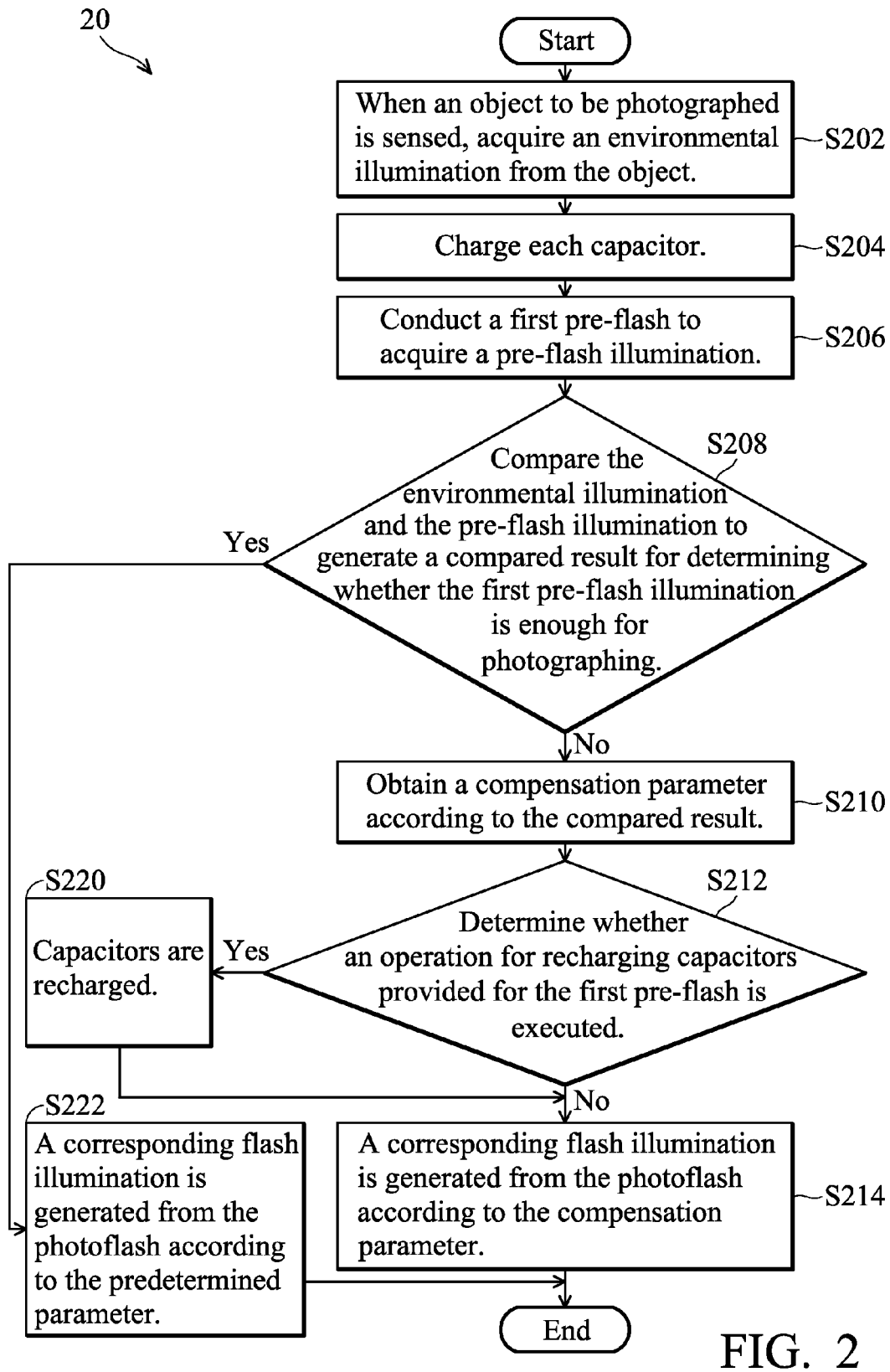
FIG. 2 is a flowchart illustrating a charged capacitor switching method for an image capture apparatus with a photoflash according to one embodiment of the invention.

FIG. 2 is a flowchart illustrating a charged capacitor switching method for an image capture apparatus with a photoflash according to one embodiment of the invention. The photoflash is driven by a plurality of capacitors connected in parallel. According to one embodiment, the image capture apparatus is a camera and a video camera. According to another embodiment, the image capture apparatus is a digital camera and a digital video camera.

Referring to FIG. 2, when an object to be photographed is sensed, a first image is captured from the object to be photographed in a first state and an environmental illumination is then acquired according to the first image (step S202). In one embodiment, the flash illumination is eliminated in the first state. Next, a reference voltage (Vin as shown in FIG. 1) is applied to the capacitors for charging (step S204). Then, a second image is captured from the object to be photographed in a second state. In one embodiment, the photoflash is driven to conduct a first pre-flash through at least one of the capacitors (such as the capacitor C1 in FIG. 1) according to a predetermined parameter. Subsequent to the first pre-flash, a pre-flash illumination is accordingly acquired according to the second image (step S206). A compared result is then generated by comparing the environmental illumination and the pre-flash illumination. It is also determined whether the compared result has reached a threshold. That is, whether the first pre-flash illumination is enough for photographing (step S208).

When the pre-flash illumination is enough for photographing, the photoflash generates a corresponding flash illumination according to the predetermined parameter (step S222).

Further, when the compared result is below the threshold, i.e., the pre-flash illumination is insufficient for photographing, a compensation parameter is obtained according to the compared result (step S210). As described above, a number of capacitors and a pulse time from the compensation parameter are used for determining a flash intensity and a flash duration of the photoflash, respectively. In one embodiment, the compensation parameter corresponding to the compared result is acquired from a look-up table, so as to compensate for the insufficient illumination from the first pre-flash.

In detail, it is determined whether an operation for recharging all capacitors provided for the first pre-flash is executed (step S212). If yes, all capacitors or some capacitors are recharged (step S220). As a result, the photoflash generates a corresponding flash illumination through at least two of the capacitors according to the number of capacitors and the pulse time determined by the compensation parameter (step S214).

Note that the operations for acquiring the environmental illumination and the pre-flash illumination were described in the aforementioned embodiments with reference to FIG. 1, and hence, further description is omitted for brevity.

Additionally, according to an embodiment, a second pre-flash may be performed by adding the number of charged capacitors when the illumination from the first pre-flash is insufficient. Then, the object to be photographed is captured and the aforementioned processing operations are performed again to calculate a corresponding illumination. More specifically, if the second pre-flash operation is still insufficient, the compensation parameter may be obtained according to the insufficient illumination from the second pre-flash. Alternatively, a third pre-flash may be carried out by increasing the number of charged capacitors. The illumination intensity in the environment, speed of exposure or image quality for photographing, dictates the operations to be performed.

Figure 3:
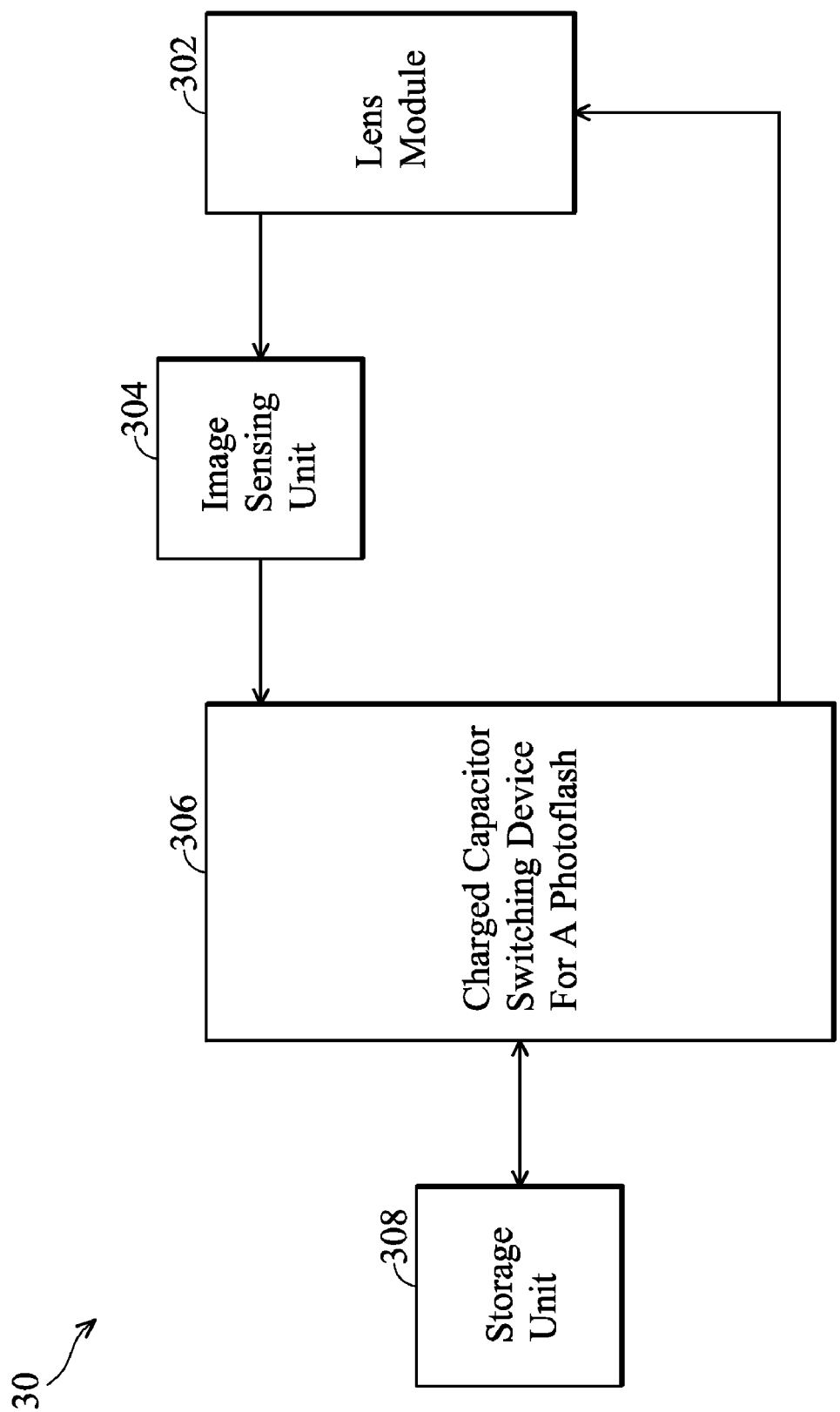
FIG. 3 is a block diagram illustrating an image capture apparatus according to one embodiment of the invention.

FIG. 3 is a block diagram illustrating an image capture apparatus 30 according to one embodiment of the invention. As shown in FIG. 3, the image capture apparatus 30 comprises a lens module 302, an image sensing unit 304, and a charged capacitor switching device for a photoflash 306. The image sensing unit 304 is coupled to the lens module 302 for capturing an object to be photographed through the lens module 302. The charged capacitor switching device for the photoflash 306 is coupled to the image sensing unit 304 for receiving the captured image and determining the required illumination needed to compensate for the object to be photographed according to the illumination of the image. Then, the operation for switching of the internally charged capacitors may be thereafter dynamically adjusted for photographing. Since structures and operations in the charged capacitor switching device for the photoflash 306 are similar to those of FIG. 1, thus, further description is omitted for brevity. According to an embodiment of the invention, the image capture apparatus 30 is a digital camera or a digital video camera, for example, a motion-sensing camera.

Moreover, the image capture apparatus 30 further comprises a storage unit 308 for storing a look-up table. From the aforementioned description, it is known that the charged capacitor switching device for the photoflash 306 obtains an adequate compensation parameter according to the look-up table and the acquired illumination of the captured image, so as to determine a number of capacitors and a pulse time required for the flash intensity and the flash duration of the photoflash. Note that the operation for acquiring the illumination is described above in the embodiments of FIG. 1, so further description is omitted for brevity.

As a result, compared to the prior art, the image capture apparatus with a charged capacitor switching device for a photoflash and switching method thereof of the invention, can more flexibly switch the charged capacitors according to a photographing condition, saving unnecessary waiting time for charging of the capacitors. Additionally, a clear photograph can be taken from further distances. For example, when photographing wild animals, a first pre-flash is performed when the presence of an animal is sensed. It is then determined whether the illumination of the first pre-flash is sufficient. If the illumination is insufficient, a second pre-flash can be subsequently performed by utilizing the remaining charged capacitors, without waiting for recharging of the capacitors. Alternatively, a subsequent photograph or even repeated shots can also be taken. Thus, it is possible to clearly capture the animal at a further distance. As such, photographing speed, quality and distance are significantly improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A charged capacitor switching device for a photoflash, comprising:
   a flash control unit, comprising the photoflash and a driving unit, wherein the driving unit controls a flash duration of the photoflash;
   a capacitor charging/discharging unit coupled to the flash control unit, comprising a plurality of capacitors connected in parallel and switches respectively coupled thereto for controlling charge or discharge operations for each capacitor, wherein the capacitors determine a flash intensity of the photoflash;
   a charged capacitor switching unit coupled to the capacitor charging/discharging unit, determining whether each switch is opened or closed according to a compensation parameter and driving the photoflash to generate a corresponding flash illumination through at least two of the capacitors; and
   an illumination modulator coupled to the flash control unit and the charged capacitor switching unit, comparing an environmental illumination and a pre-flash illumination to generate a compared result, determining whether the compared result has reached a threshold, obtaining the compensation parameter according to the compared result when the compared result is below the threshold, and driving the flash control unit to generate the corresponding flash illumination according to the compensation parameter.

2. The device as claimed in claim 1, wherein the charged capacitor switching unit controls the switches according to a predetermined parameter and drives the photoflash to conduct a first pre-flash through at least one of the capacitors.

3. The device as claimed in claim 1, wherein the environmental illumination is determined according to a first image captured in a first state and the pre-flash illumination is determined according to a second image captured in a second state.

4. The devices as claimed in claim 3, wherein a flash illumination is eliminated in the first state and the flash control unit is driven by a predetermined parameter to conduct a first pre-flash operation on an object to be photographed in the second state.

5. The device as claimed in claim 2, wherein the charged capacitor switching unit determines whether an operation for recharging a capacitor provided for the first pre-flash is performed.

6. The device as claimed in claim 1, wherein the illumination modulator acquires the compensation parameter from a look-up table and determines a number of capacitors and a pulse time corresponding to the flash intensity and the flash duration of the photoflash.

7. A charged capacitor switching method for an image capture apparatus with a photoflash, which is driven by a plurality of capacitors connected in parallel, comprising:
providing a capacitor charging/discharging unit coupled to the flash control unit, comprising a plurality of capacitors connected in parallel and switches respectively coupled thereto for controlling charge or discharge operations for each capacitor, wherein the capacitors determine a flash intensity of the photoflash;
providing a charged capacitor switching unit coupled to the capacitor charging/discharging unit, determining whether each switch is opened or closed according to a compensation parameter and driving the photoflash to generate a corresponding flash illumination through at least two of the capacitors;
capturing an object to be photographed as a first image in a first state;
acquiring an environmental illumination according to the first image;
capturing the object to be photographed as a second image in a second state;
acquiring a pre-flash illumination according to the second image;
generating a compared result by comparing the environmental illumination and the pre-flash illumination;
determining whether the compared result has reached a threshold;
obtaining a compensation parameter according to the compared result when the compared result is below the threshold; and
driving the photoflash to generate a corresponding flash illumination through at least two of the capacitors and the compensation parameter.

8. The method as claimed in claim 7, the step of capturing the object to be photographed as the second image in the second state comprising:
driving the photoflash to conduct a first pre-flash through at least one of the capacitors according to a predetermined parameter.

9. The method as claimed in claim 7, wherein a flash illumination is eliminated in the first state.

10. The method as claimed in claim 7, wherein a first pre-flash is invoked on the object to be photographed in the second state according to a predetermined parameter.

11. The method as claimed in claim 8, further comprising:
determining whether an operation for recharging a capacitor provided for the first pre-flash is performed.

12. The method as claimed in claim 7, wherein the step of obtaining the compensation parameter further comprises:
determining a number of capacitors and a pulse time for the photoflash from a look-up table,
wherein a flash intensity of the photoflash is determined according to the number of capacitors and a flash duration of the photoflash is determined according to the pulse time.

13. The method as claimed in claim 7, wherein the step of acquiring the environmental illumination and the pre-flash illumination further comprises:
defining a sampling block in the first image and the second image for generating sampling data composed of three colors;
assigning respective weighting coefficients for the three colors;
acquiring the environmental illumination from the sampling block of the first image by summing up a product of values of the three colors from the sampling data and respective weighting coefficients; and
acquiring the pre-flash illumination from the sampling block of the second image by summing up a product of values of the three colors from the sampling data and respective weighting coefficients,
wherein the three colors are red, green and blue color.

14. The method as claimed in claim 7, wherein the image capture apparatus comprises one of a digital camera and a digital video camera.

15. An image capture apparatus, comprising:
a lens module;
an image sensing unit coupled to the lens module, capturing an object to be photographed through the lens module;
a charged capacitor switching device for a photoflash coupled to the image sensing unit, comprising:
a flash control unit, comprising the photoflash and a driving unit, wherein the driving unit controls a flash duration of the photoflash;
a capacitor charging/discharging unit coupled to the flash control unit, comprising a plurality of capacitors connected in parallel and switches respectively coupled thereto for controlling charge or discharge operations for each capacitor, wherein the capacitors determine a flash intensity of the photoflash;
a charged capacitor switching unit coupled to the capacitor charging/discharging unit, determining whether each switch is opened or closed according to a compensation parameter and driving the photoflash to generate a corresponding flash illumination through at least two of the capacitors; and
an illumination modulator coupled to the flash control unit and the charged capacitor switching unit, acquiring an environmental illumination of a first image captured in a first state, acquiring a pre-flash illumination of a second image captured in a second state, comparing the environmental illumination and the pre-flash illumination to generate a compared result, determining whether the compared result has reached a threshold, obtaining the compensation parameter according to the compared result when the compared result is below the threshold, and driving the flash control unit to generate a corresponding flash illumination according to the compensation parameter.

16. The apparatus as claimed in claim 15, wherein the charged capacitor switching unit controls the switches according to a predetermined parameter and drives the photoflash to conduct a first pre-flash through at least one of the capacitors.

17. The apparatus as claimed in claim 15, wherein a flash illumination is eliminated in the first state.

18. The apparatus as claimed in claim 15, wherein the flash control unit is driven by a predetermined parameter to conduct a first pre-flash operation on the object to be photographed in the second state.

19. The apparatus as claimed in claim 15, further comprising:
a storage unit, for storing a look-up table, wherein the illumination modulator acquires the compensation parameter from the look-up table and determines a number of capacitors and a pulse time corresponding to the flash intensity and the flash duration of the photoflash.

20. The apparatus as claimed in claim 15, wherein the illumination modulator respectively defines a sampling block in the first image and the second image for generating sampling data composed of three colors with respective weighting coefficients, acquires the environmental illumination from the sampling block of the first image by summing up a product of values of the three colors from the sampling data and respective weighting coefficients, and acquires the pre-flash illumination from the sampling block of the second image by summing up a product of values of the three colors from the sampling data and respective weighting coefficients, and wherein the three colors are red, green and blue color.

* * * * *